United States Patent [19]
Okabe et al.

[11] Patent Number: 5,393,460
[45] Date of Patent: Feb. 28, 1995

[54] LIQUID CRYSTAL COMPOSITION, AND ELEMENT AND DEVICE USING THE SAME

[75] Inventors: Nobuhiro Okabe; Tadaaki Isozaki; Yoshiichi Suzuki, all of Tokyo, Japan

[73] Assignee: Showa Shell Sekiyu Kabusyiki Kaisha, Tokyo, Japan

[21] Appl. No.: 102,780

[22] Filed: Aug. 6, 1993

[30] Foreign Application Priority Data

| Aug. 6, 1992 | [JP] | Japan | 4-231430 |
| Aug. 6, 1992 | [JP] | Japan | 4-231431 |
| Aug. 6, 1992 | [JP] | Japan | 4-231432 |

[51] Int. Cl.⁶ .................. C09K 19/12; C09K 19/20; G02F 1/13
[52] U.S. Cl. ................. 252/299.65; 252/299.01; 252/299.66; 252/299.67; 359/103
[58] Field of Search .......... 252/299.01, 299.64, 252/299.65, 299.66, 299.67; 359/103, 104

[56] References Cited

U.S. PATENT DOCUMENTS

| 5,116,531 | 5/1992 | Hagiwara et al. | 252/299.65 |
| 5,207,947 | 5/1993 | Suzuki et al. | 252/299.67 |

FOREIGN PATENT DOCUMENTS

| 0418604 | 3/1991 | European Pat. Off. |
| 0425366 | 5/1991 | European Pat. Off. |

OTHER PUBLICATIONS

Kazuyuki Hiraoka et al, "Dielectric Behavior and the Devel's Staircase . . . ", Jpn. J. Appl. Phys. vol. 31, 1992 pp. 3394–3398, Part 1, No. 10, Oct. 1992.

T. Isozaki et al, "Competition Between Ferroelectric . . . ", Jpn. J. Appl. Phys. vol. 31, 1992, pp. L 1435–1438, Part 2, No. 10A, Oct. 1, 1992.

Kataro Kajikawa et al, "Mirrorless Microcavity . . . ", Jpn. J. Appl. Phys. vol. 31, 1992, pp. L 679–681, Part 2 No. 6A, Jun. 1, 1992.

T. Isozaki et al, "Successive Phase Transitions . . . ", Jpn. J. of App. Phys., vol. 30, No. 9A, Sep. 1991, pp. L 1573–1575.

Ji Ll et al, "Novel Temperature Dependences . . . ", Jpn. J. App. Phys. vol. 30, Mar. 3, 1991, pp. 532–536.

N. Okabe et al, "Reentrant Antiferroelectric Phase . . . ", Jpn. J. Appl. Phys. vol. 31, 1992, pp. L793–796, Part 2, No. 6B, Jun. 15, 1992.

"Manifestation of chiral asymmetry of ferroelectric liquid crystals induced by optically active dipole dopants in a linear electrooptic effect", Rabinovich et al, Liquid crystal vol. 6, No. 5, 1989, pp. 533–544.

*Primary Examiner*—Shean Wu
*Attorney, Agent, or Firm*—Cushman, Darby & Cushman

[57] ABSTRACT

A liquid crystal composition is disclosed having antiferroelectric phases at two temperature ranges. A liquid crystal element and device using the liquid crystal composition are also disclosed.

13 Claims, 10 Drawing Sheets

OPTICAL RESPONSE OF BISTABLE LIQUID CRYSTAL

OPTICAL RESPONSE OF TRISTABLE LIQUID CRYSTAL

LIQUID CRYSTAL COMPOSITION, AND ELEMENT AND DEVICE USING THE SAME

The present invention relates to a liquid crystal composition, a liquid crystal element using the composition, and a liquid crystal device having the element.

Particularly, the present invention relates to a novel antiferroelectric liquid crystal element using a liquid crystal exhibiting two kinds of antiferroelectric phases having three optically stable states (three stable states), a device using the liquid crystal element, and a driving method of the device.

As liquid crystal elements, the elements called TN (twisted nematic) type are heretofore generally used (M. Schadt and W. Herfrich, Applied Physics Letters, Vol. 18, No. 4, pp 127–128). In the TN type liquid crystal elements, a nematic liquid crystal is inserted between a pair of transparent electrode substrates so that liquid crystal molecules are twisted by 90° between an upper and lower substrate. Liquid crystal elements destroy twisted structure by application of electric field, and allow or intercept the passing of light to make display bright or dark.

However, when TN type liquid crystal elements were used in a liquid crystal display device having a structure of matrix electrode in which a group of scanning electrodes and a group of signal electrodes both in a belt form are disposed orthogonally, problems are posed such that response speed is slow, voltage-light transmittance performance is not sufficiently nonlinear, and thus, the picture element density of matrix can not satisfactorily be increased, leading to an existing considerable restriction in their applications.

Under the circumstances mentioned above, the liquid crystal synthesized by Meyer et al. showing a ferroelectric property has attracted public attention (Le Journal de Physique, Vol. 36, March 1975, L-69 to L-71).

The liquid crystals or their elements now most widely being studied are ferroelectric liquid crystal ones having bistable states (Japanese Examined Patent Publication 63-22287 and U.S. Pat. No. 4,367,924). As bistable liquid crystals, liquid crystals having an optically active chiral smectic phase C(SmC*) or phase H(SmH*) is known. The liquid crystals form an inherent spiral structure in a bulk state. When the liquid crystals were held between substrates which were spaced at a sufficiently small distance to suppress the formation of spiral structure, the liquid crystals show two stable states against electric field. In brief, liquid crystals are aligned in the first optically stable state to the electric field in one direction and aligned in the second optically stable state to the electric field in reverse direction. Accordingly, the two optically stable states mentioned above can be switched by the direction of electric field applied. Further, the liquid crystals have advantages such that switching speed is extremely fast compared with the TN type crystal liquid crystals and that even when electric field was removed, the liquid crystals have the characteristic of maintaining each stable state. FIG. 1(b) shows the change in light transmittance when an electric field was applied by a triangular wave voltage as shown in FIG. 1(a) on liquid crystals in a display device.

On the other hand, antiferroelectric liquid crystals having three optically stable states have been presented and been noticed as ones having an excellent electro-optic effect in recent years (A.D. L. Chandani, E. Gorecka, Y. Ouchi, H. Takezoe, and A. Fukuda, Jpn. J. Appl. Phys., 28 (1989) L 1265).

The liquid crystals are aligned in the first optically stable state when electric field is not applied, in the second optically stable state in the electric field of one direction, and further aligned in the third optically stable state in the electric field of reverse direction, and a high speed switching can be achieved among the three stable states mentioned above by changing the direction and strength of applied electric field. Besides, realization of a highly fine matrix type liquid crystal display device exhibiting a high contrast is expected from the fact that the changes in light transmittance among the three stable states against an applied voltage shows a hysteresis shifting on voltage-axis (for instance, the voltage at which light transmittance is varied is different between the time when the first stable state was changed to the second stable state by increasing an applied electric field and the time when the second stable state was conversely changed to the first stable state by decreasing an applied electric field). FIG. 1(c) shows a change in light transmittance when an electric field of triangular wave voltage as shown in FIG. 1(a) was applied on the liquid crystals in a display device.

The liquid crystal compounds having a liquid crystal phase S*(3) showing tristable states in a phase series are disclosed in Japanese Unexamined Patent Publication Nos. 1-316367, 1-316372, 1-316339, and 2-28128 filed by the present applicants, and in Japanese Unexamined Patent Publication No. 1-213390 filed by Ichihashi et al. Liquid crystal electooptical devices utilizing the tristable states are newly proposed in Japanese Unexamined Patent Publication Nos. 2-40625, 2-153322, and 2-173724 filed by the present applicants.

Now, it is necessary to apply a voltage higher than a threshold value in order that the liquid crystal elements using antiferroelectric liquid crystals having the three optically stable states (three stable states) conduct a desired electrooptical response. Cell thickness currently being used is greater than 2 $\mu$m. When cells having a thickness less than 2 $\mu$m are to be prepared, it is difficult to make their thickness uniform, leading to high production cost.

The threshold voltage for antiferroelectric phases of antiferroelectric liquid crystals known at present is higher than 20 to 30 V when they are inserted in cells of 2 $\mu$m thickness (that is, an electric field of 10 to 15 V/$\mu$m is necessary). Since when cells are driven, positive and negative voltage are alternatively applied, a driving circuit is required to stand ±30 V, or higher than 60 V in terms of withstand voltage. Integrated circuits which are resistant to such voltage become specific so that inexpensive circuits can not be available. Thus, antiferroelectric liquid crystals having a low threshold voltage are required, but reports about such liquid crystals have not yet been published.

On the other hand, conventional antiferroelectric liquid crystals have only following three types of phase series and antiferroelectric liquid crystals having other phase series have not yet been known:

(1) SmC* A←SmC*$\gamma$←SmC*←SmC*$\alpha$←Sm A←Iso
(2) SmC* A←SmC*←Sm A←Iso
(3) SmC* A←Sm A←Iso
   Iso: Isotropic phase
   Sm A: Smectic phase A
   SmC*$\alpha$: Smectic phase C$\alpha$
   SmC*: Smectic phase C (Ferroelctric phase)

SmC*γ: Smectic phase Cγ
SmC* A: Antiferroelectric phase

An object of the present invention is to provide a liquid crystal composition having a novel type of phase series, so to speak, the fourth type of phase series.

Another object of the present invention is to provide a liquid crystal element in which the composition is inserted. Particularly, another object of the present invention is to provide a liquid crystal element in which an antiferroelectric liquid crystal composition exhibiting three stable states at a low threshold voltage is inserted.

Still another object of the present invention is to provide a liquid crystal device or method for driving a liquid crystal device in which such liquid crystal element is used.

Further objects of the present invention will be apparent to those skilled in the art from the following detailed description and appended claims.

Figure 1A:
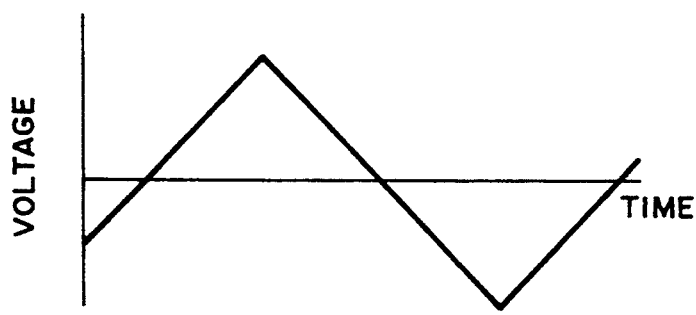
FIG. 1(a) shows an applied triangular wave voltage, and FIG. 1(b) and (c) show optical response characteristics of a liquid crystal having bistable states and of a liquid crystal having tristable states, respectively.
Figure 1B:
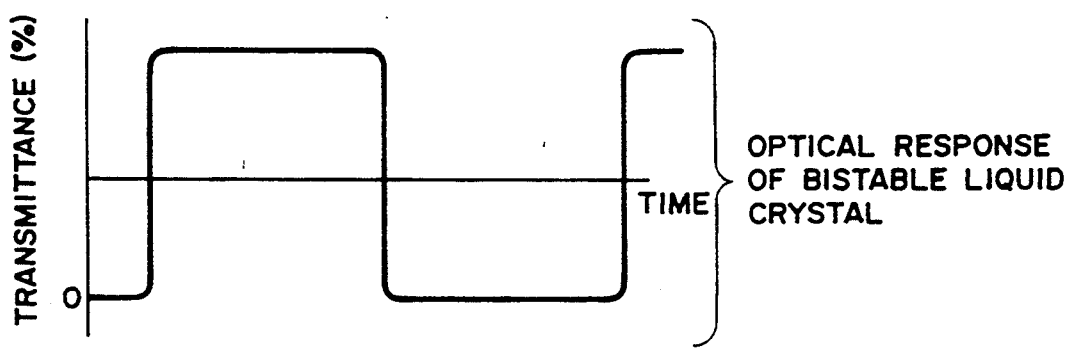
Figure 1C:
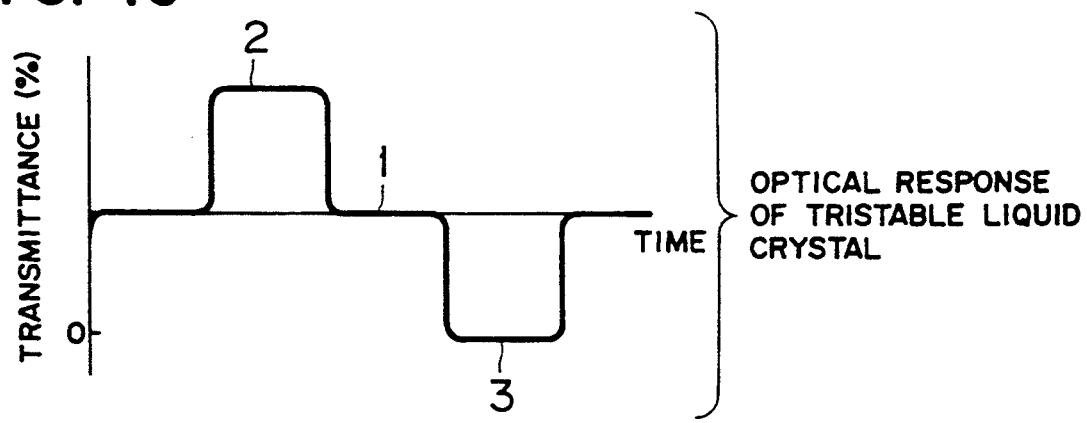
Figure 2:
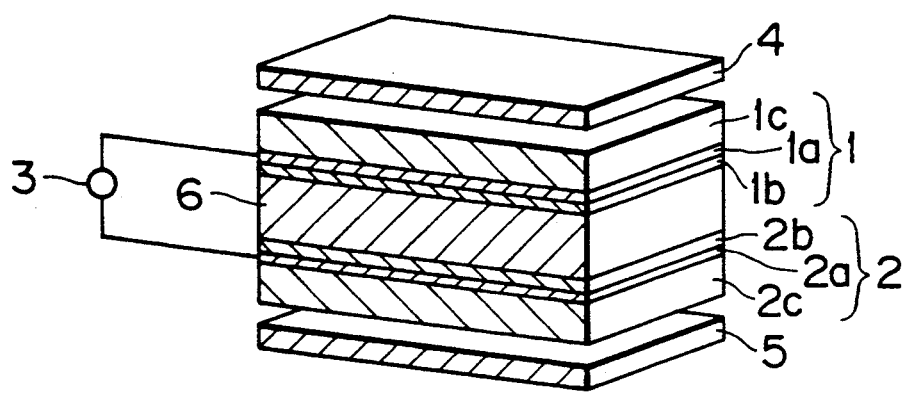
FIG. 2 shows an enlarged cross-sectional perspective view illustrating whole construction of a liquid crystal element used in Examples of the present invention.

In FIG. 2, 1 is an electrode substrate in which 1a is a transparent electrode, 1b is an oriented control film, and 1c is a transparent substrate, 2 is another electrode substrate in which 2a is another transparent electrode, 2b is another oriented control film, and 2c is another transparent substrate, 3 is a power source, 4 is a polarizing plate, 5 is another polarizing plate, and 6 is an antiferroelectric liquid crystal.

The first aspect of the present invention relates to a liquid crystal element in which a liquid crystal composition is inserted between a pair of electrode substrates characterized in that the liquid crystal composition has an antiferroelectric phase in two temperature ranges.

The words "a liquid crystal composition has an antiferroelectric phase in two temperature ranges" herein referred to mean that a liquid crystal has a novel type of phase series as shown below:

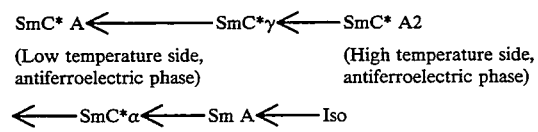

In other words, it is to mean a novel type of phase series in which an antiferroelectric phase appears both in a high temperature range, and in a low temperature range (in which an antiferroelectric phase is observed even in a conventional antiferroelectric phase).

Specific example of a liquid crystal composition having an antiferroelectric phase in two temperature ranges include such composition as shown below:

(1) A composition comprising a compound represented by the following general formula (I) and having an optical purity of higher than 80% e.e.

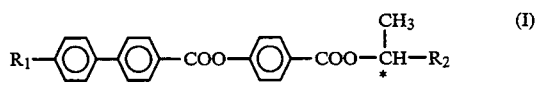

wherein $R_1$ and $R_2$ are independently selected from the group consisting of alkyl groups having from 4 to 18 carbon atoms, and * shows an asymmetric carbon atom.

(2) A composition comprising not less than 80 parts by weight of a compound represented by the general formula (III):

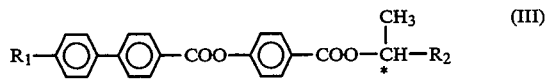

wherein $R_1$ is an alkyl group or alkoxy group having from 4 to 18 carbon atoms, $R_2$ is an alkyl group having from 4 to 18 carbon atoms, and * shows an asymmetric carbon atom, and less than 20 parts by weight of a compound represented by the general formula (IV):

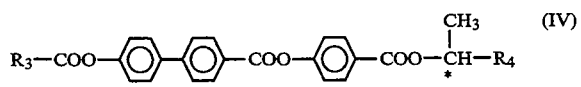

wherein $R_3$ and $R_4$ are independently selected from the group consisting of alkyl groups having from 4 to 18 carbon atoms, and * shows an asymmetric carbon atom, the compounds having an optical purity of higher than 80% e.e., respectively; when the compound of the general formula (III) is an R-isomer, the compound of the general formula (IV) also being an R-isomer; and when the compound of the general formula (III) is an S-isomer, the compound of the general formula (IV) also being an S-isomer.

(3) A composition comprising 80 to 40 parts by weight of a compound represented by the general formula (VII):

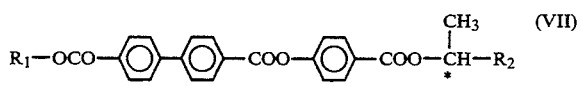

(VII)

wherein $R_1$ and $R_2$ are independently selected from the group consisting of alkyl groups having from 4 to 18 carbon atoms, and * shows an asymmetric carbon atom, and 20 to 60 parts by weight of a compound represented by the general formula (IV):

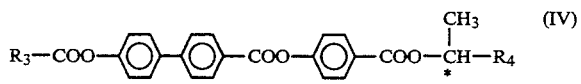

(IV)

wherein $R_3$ and $R_4$ are independently selected from the group consisting of alkyl groups having from 4 to 18 carbon atoms, and * shows an asymmetric carbon atom, the compounds having an optical purity of higher than 80% e.e., respectively; when the compound of the general formula (VII) is an R-isomer, the compound of the general formula (IV) also being an R-isomer; and when the compound of the general formula (VII) is an S-isomer, the compound of the general formula (IV) also being an S-isomer.

The second aspect of the present invention relates to a liquid crystal device characterized in that a temperature compensatory circuit to stably maintain the temperature range in which an antiferroelectric phase of a liquid crystal composition at high temperature side appears is provided to a liquid crystal element.

The temperature compensatory circuit is not specifically restricted provided that it has a capability of maintaining a temperature range in which an antiferroelectric phase of a liquid crystal composition at high temperature side is produced, and a conventional temperature compensatory circuit such as a diode, thermister, and varistor can be used as the circuit.

Specifically, as the temperature compensatory circuit mentioned above, the circuits can be used such as disclosed in, for example, "Semiconductor Handbook" (The Second Edition) published by Ohm Co., Ltd. on Nov. 30, 1977 pp 507–509, 663–664, 696, and 861–862. Usually, it will be satisfactory to select a circuit having a certain extent of accuracy from temperature compensatory circuits on the market under which accuracy a temperature range in which an objective state of liquid crystal is maintained can be compensated.

The third aspect of the present invention relates to a method for driving a liquid crystal device characterized in that a liquid crystal device is driven at a temperature range in which an antiferroelectric phase of a liquid crystal composition at high temperature side is produced.

While the threshold voltage in a SmC* A phase at a low temperature side is 25 V (at cell thickness of 10 μm), the threshold voltage in an antiferroelectric phase at high temperature side is 8 V (at cell thickness of 10 μm). When the antiferroelectric phase at high temperature side is compared with that of low temperature side, the relative dielectric constant of phase SmC* A at low temperature side is 5 to 8, while that of an antiferroelectric phase at high temperature side is 10 to 20.

Accordingly, a device must be driven at a high voltage at low temperature side to drive a liquid crystal in three stable states, while a device can be driven at a lower voltage at high temperature side. As explained above, the device according to the present invention is commercially very advantageous since a general driving circuit which has been used, for example, for nematic liquid crystal and others can be employed due to the low threshold voltage.

Also, since liquid crystals are sometimes exposed to a high temperature due to exothermic of back lights in ordinary uses, the device of the present invention is much more advantageous in such cases.

As an example of a method for synthesizing a compound of the general formula (I) used in the present invention is explained as follows:

(a) 4'-n-Alkylbiphenyl-4-carboxylic acid (1) is refluxed in an excess amount of thionyl chloride to obtain a chloride (2).

(b) 4-Benzyloxy benzoic acid is refluxed in an excess amount of thionyl chloride to obtain its chloride (3). This chloride (3) is added with optically active (optical purity of higher than 98% e.e.) 2-alkanol and subjected to reaction in methylene chloride in the presence of triethylamine to obtain corresponding 4-benzyloxy benzoate (4). Then, this benzoate (4) is subjected to a catalytic reduction to obtain 4-hydroxybenzoate (5).

(c) The compounds (2) and (5) mentioned above are reacted in methylene chloride in the presence of triethylamine to obtain 4- (2-alkyloxycarbonyl ) phenyl 4'-alkylbiphenyl-4-carboxylate (6) which is an objective compound of the present invention.

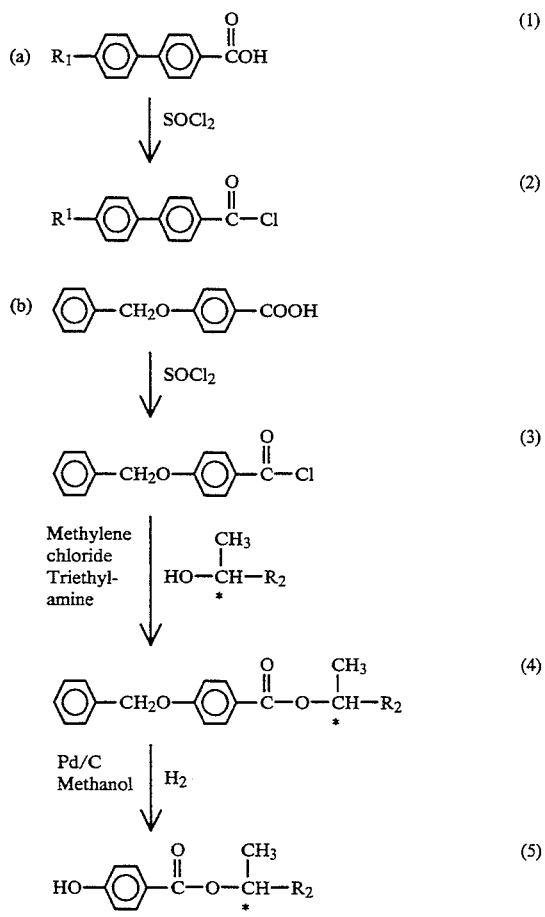

-continued (c)

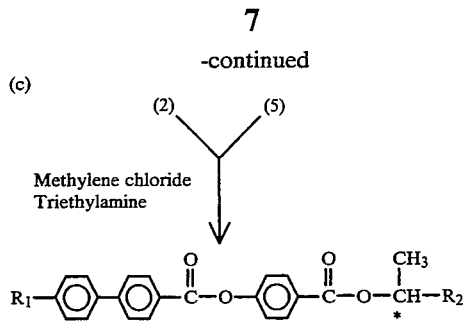

According to the present invention, a liquid crystal element can be provided which element uses a liquid crystal composition having a novel type of phase series.

Also, according to the present invention, a liquid crystal element can be driven at an extremely low potential difference of driving voltage compared with a conventional antiferroelectric liquid crystal composition by employing an antiferroelectric phase at high temperature side.

As explained above, the liquid crystal element of the present invention can be used as, for example, highly precise display elements for large scopes; TV picture image display elements; and elements for liquid crystal light shutters, demonstrating remarkable effects, since an excellent electro-optic effect of an antiferroelectric liquid crystal can sufficiently be produced at a low driving voltage.

The present invention will now be described in further detail with reference to Examples. However, it should be understood that the present invention is by no means restricted by such specific Examples.

EXAMPLE 1

Synthesis of 4(1-methylheptyloxycarbonyl)phenyl 4'-octylbiphenyl-4-carboxylate

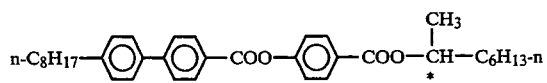

To a round bottom flask of 100 ml was placed 1.5 g of 4'-octylbiphenyl-4-carboxylic acid, added 3 g of thionyl chloride, and further added a small amount of N,N-dimethyl formamide, and then the contents in the flask were subjected to reflux for 4 hours. An excess amount of thionyl chloride was distilled off to obtain 1.6 g of 4'-octylbiphenyl-4-carboxylic acid chloride. To this acid chloride was added a solution prepared by dissolving 0.6 g of optically active 4-hydroxy benzoic acid 2-octyl ester having an optical purity of 98% e.e., 0.4 g of triethylamine, and 0.15 g of dimethylamino pyridine in 50 ml of methylene chloride, and then the contents in the flask were stirred a whole day and night. After finishing the reaction, white insoluble matters produced were filtered off. After methylene chloride layer formed was washed sufficiently with a diluted hydrochloric acid and water, and dried, the organic solvent was separated under a reduced pressure. Crude products thus obtained were purified by column chromatography and recrystallization to obtain an objective compound having an optical purity of 98% e.e.

Figure 3:
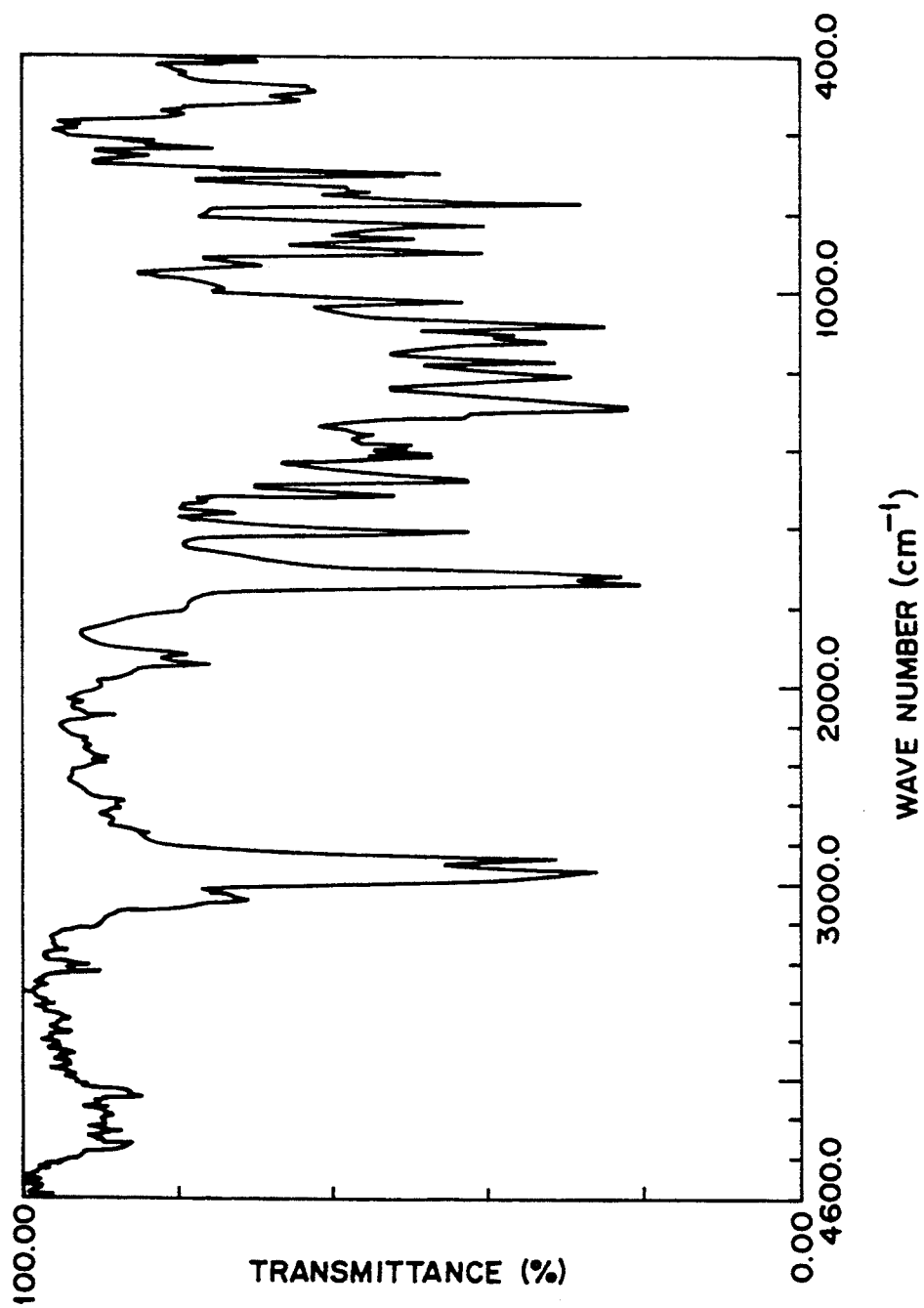
FIG. 3 shows an infrared absorption spectrum of the liquid crystal compound prepared in Example 1 of the present invention.

An infrared absorption spectrum of the compound by KBr method is shown in FIG. 3.

EXAMPLE 2

The liquid crystal compound, 4-(1-methylheptyloxycarbonyl)phenyl 4'-octylbiphenyl-4-carboxylate (optical purity 98% e.e.) obtained in Example 1 was filled in the form of an isotropic phase to a liquid crystal cell having a cell thickness of 10 μm and having a rubbed polyimide oriented film on an ITO electrode (transparent electrode) substrates to prepare a liquid crystal thin film cell.

Figure 4:
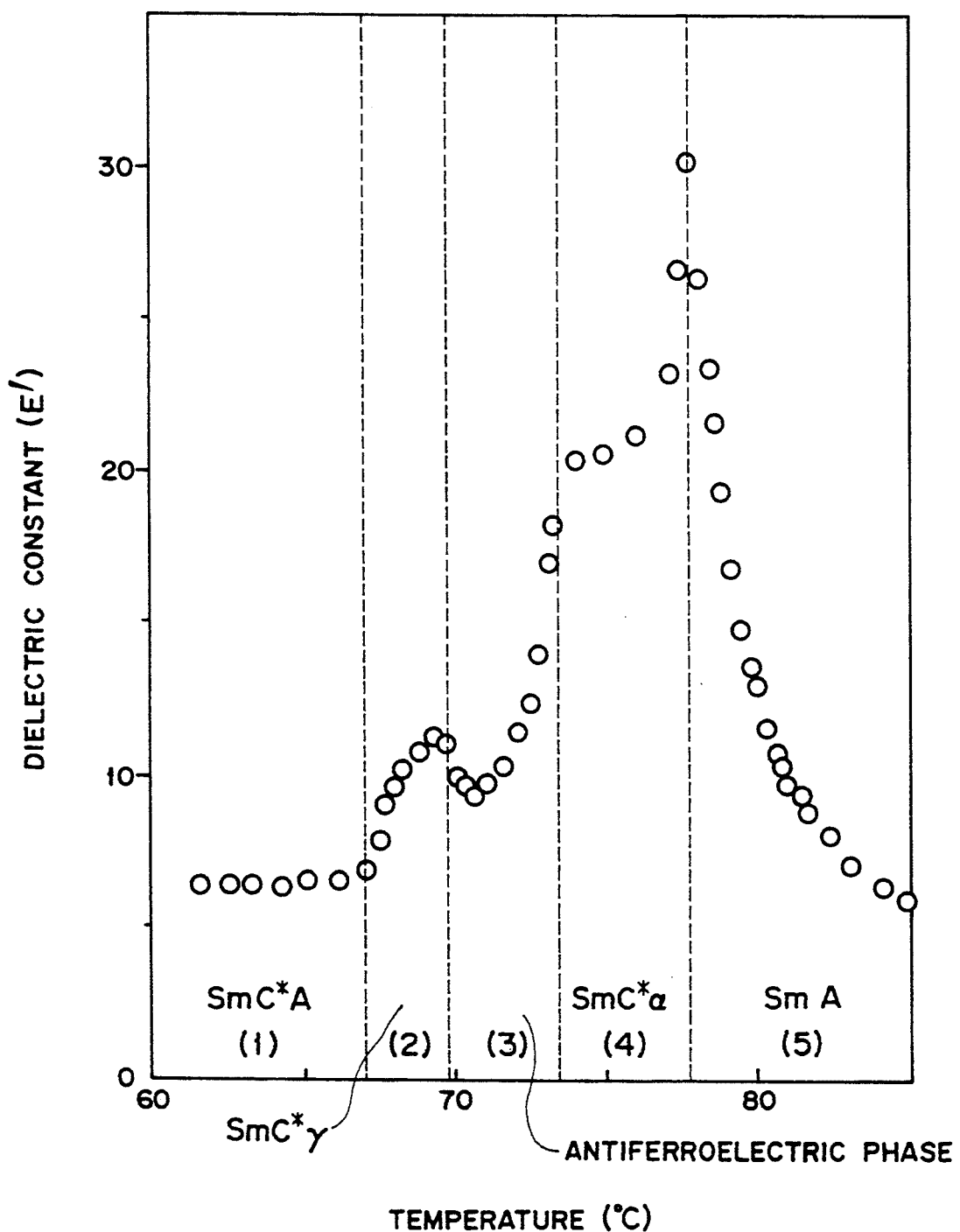
FIG. 4 is a graph illustrating the plot of relative dielectric constant (E') of the liquid crystal compound of Example 1 against temperature in Example 2.

The liquid crystal cell thus prepared was cooled down to a temperature where phase SmC* A at low temperature side appeared. Then, the relative dielectric constant of the liquid crystal cell was determined by using an impedance analyzer while raising the temperature of the cell at a temperature gradient of 0.1° C./min. FIG. 4 shows the variations of the relative dielectric constant of the liquid crystal compound with temperature. From FIG. 4, it can be understood that a phase SmC* A (1) became an antiferroelectric phase (AF) (3) via a phase SmC*γ (2) and that the relative dielectric constant slightly fell at the phase (3).

Figure 5:
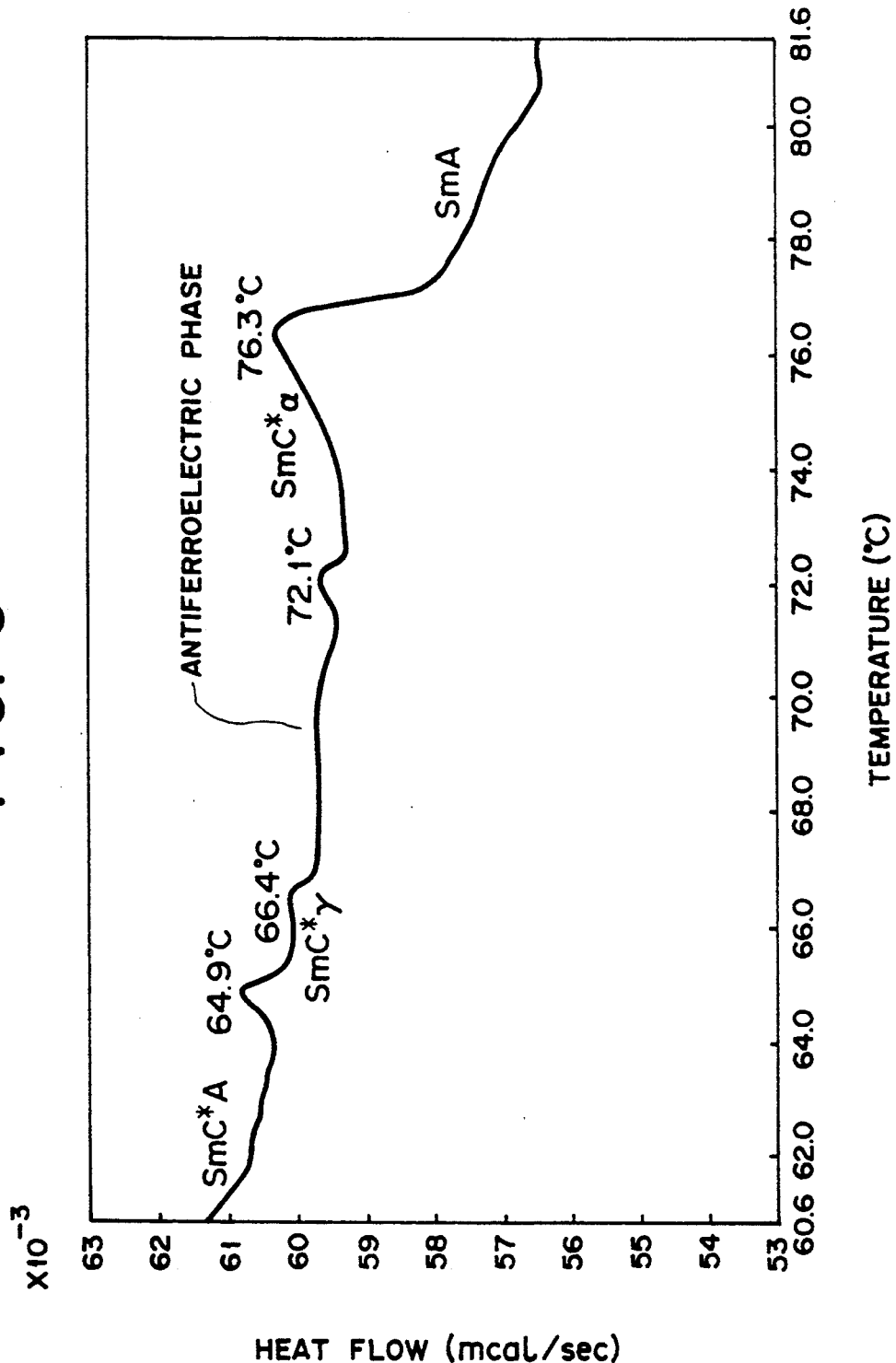
FIG. 5 is a graph showing the relationship between exothermic peaks and temperatures in a differential thermal analysis of the liquid crystal compound of Example 1 in Example 2.

Heat flow (120° C. to 20° C., cooling rate 3° C./min) in differential scanning calorimeter (DSC) was also determined. FIG. 5 shows exothermic peaks observed at from 80° C. to 60° C. which indicate phase transition temperatures.

From the results of determination of the relative dielectric constant and DSC, the phase transition temperatures of the compound of Example 1 are summarized as follows:

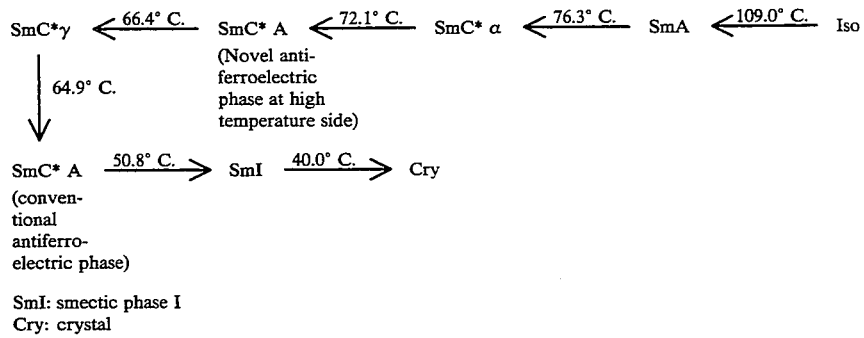

SmI: smectic phase I
Cry: crystal

The liquid crystal cell prepared for the determination of relative dielectric constant was arranged in the form of a phase SmC* A at low temperature side at 59° C. on a polarizing microscope equipped with a photomultiplier where 2 polarizing plates were orthogonally arranged with each other in such a state that the visual field was dark when voltage was −25 V.

Figure 6:
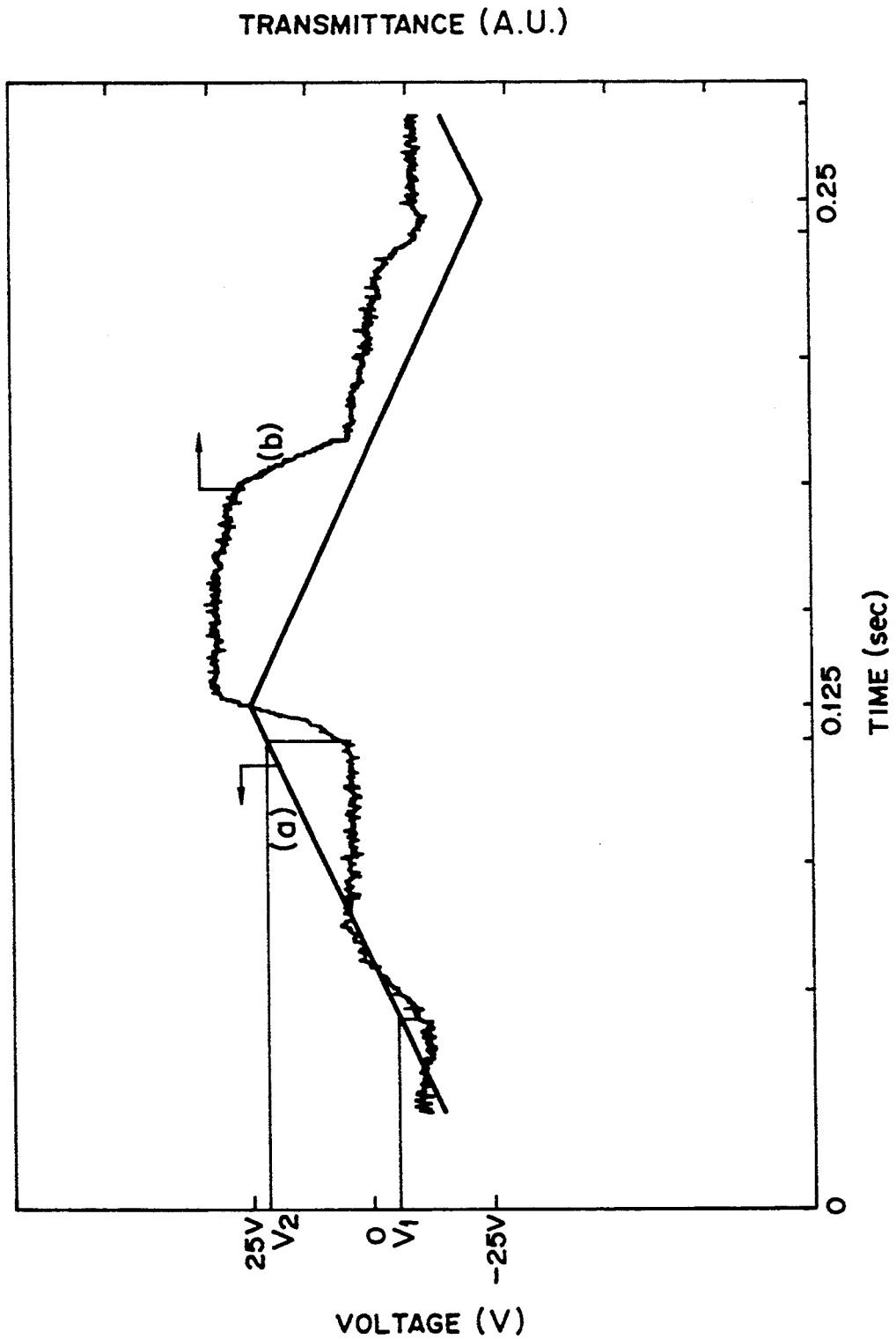
FIG. 6 is a graph showing the variations of the triangular wave voltage (a) applied at 59.0° C. on the liquid crystal compound of Example 1 and light transmittance (b) of the compound with time in Example 2, respectively.

The liquid crystal cell was slowly cooled down to a temperature where phase SA appeared at a temperature gradient of 0.1 to 1.0° C./min. The liquid crystal cell was further cooled down and a triangular wave voltage of ±25 V at 2.5 Hz as shown in FIG. 6 was applied at a temperature range of from 64.9° C. to 50.8° C. From the relationship between the applied voltage and light transmittance, the optical response as shown in FIG. 6 (b) was obtained.

A dark state was maintained from −25 V to $V_1$, sharply rose at $+V_1$, and then became an intermediate state. The intermediate state was maintained from $+V_1$ to $V_2$, suddenly became a bright state at $+V_2$. When applied voltage was changed from −25 V to +25 V, it was observed that the visual field changed in three states from "dark" to "intermediate" to "bright" accompanied with switching, and existence of three stable aligned states of liquid crystal molecules was confirmed.

In this case, the threshold voltage switching from an intermediate state to a bright state was about 25 V which was 2.5 V/μm in terms of electric field strength.

Figure 7:
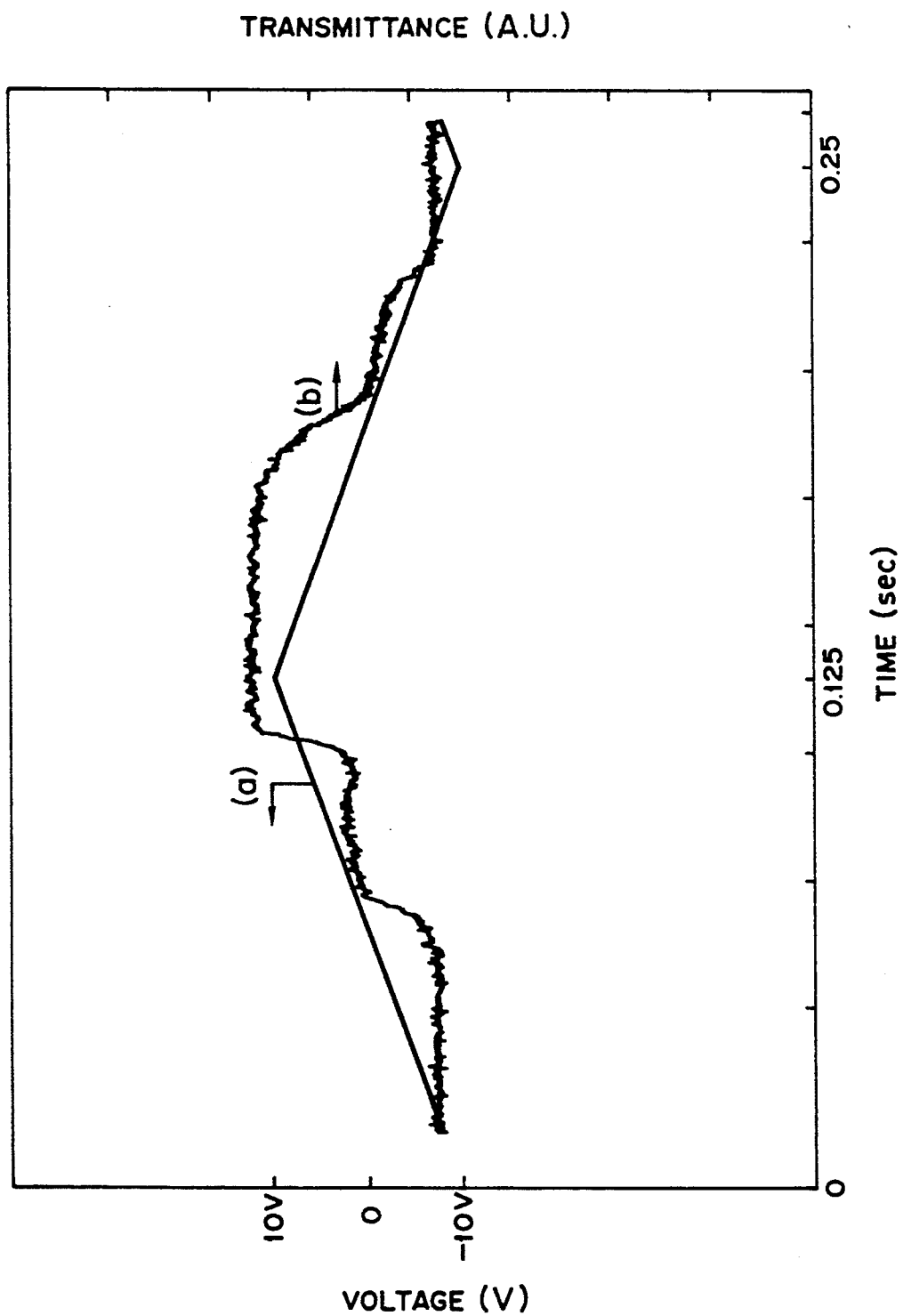
FIG. 7 is a graph showing the variations of the triangular wave voltage (a) applied at 72.0° C. on the liquid crystal compound of Example 1 and the light transmittance (b) of the compound with time in Example 2, respectively.

Then, a triangular wave voltage was similarly applied on the liquid crystal cell as it was in an antiferroelectric phase at high temperature side at 72.0° C. and light transmittance was determined results of which are shown in FIG. 7. Applied voltage was ±10 V at 2.5 Hz.

When the applied voltage was changed from −10 V to +10 V, it was observed that the visual field changed in three states from "dark" to "intermediate" to "bright" accompanied with switching, and the existence of three stable aligned states of liquid crystal molecules was confirmed.

At this time, the threshold voltage switching an intermediate state to a bright state was about 8 V which was 0.8 V/μm in terms of electric field strength.

From this fact, it can be understood that an antiferroelectric phase at high temperature side had a threshold voltage ⅓ lower than that of phase SmC* A at low temperature side.

EXAMPLE 3

R-(−)-4(1-methylheptyloxycarbonyl)phenyl 4'-octylbiphenyl-4-carboxylate represented by the formula (II) and having two antiferroelectric phases, and R-(−)-4(1-methylheptyloxycarbonyl)phenyl 4'-octylcarbonyloxybiphenyl-4-carboxylate (hereinafter referred to as R-(−)-MHPOCBC) represented by the formula (V) and having one antiferroelectric phase were mixed at a weight ratio of 80:20 to prepare a liquid crystal composition.

The liquid crystal composition thus prepared was filled in the form of an isotropic phase to a liquid crystal cell having a cell thickness of 10 μm and having a rubbed polyimide oriented film on an ITO electrode (transparent electrode) substrate to prepare a liquid crystal thin film cell.

Figure 8:
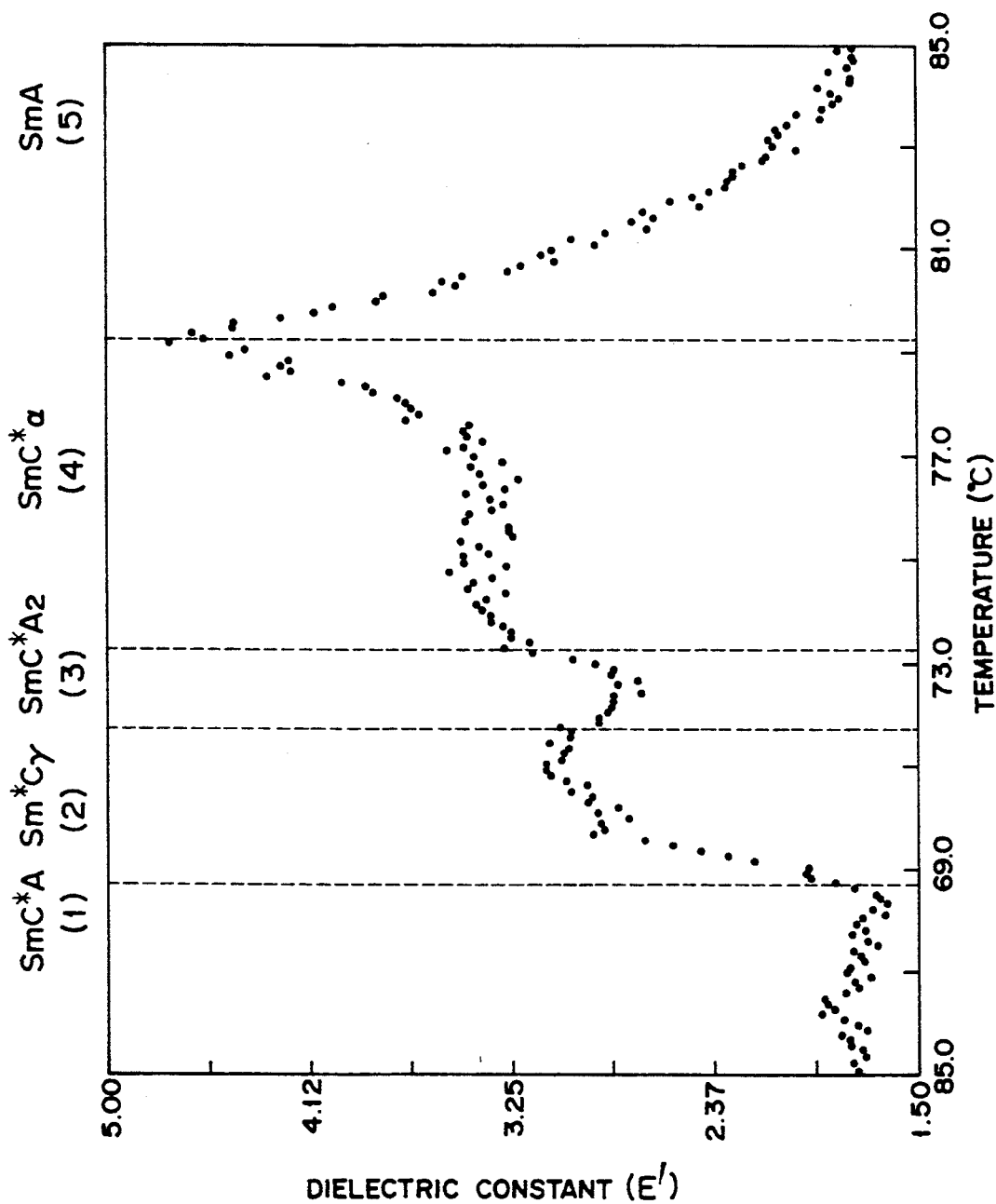
FIG. 8 is a graph illustrating the plot of relative dielectric constant (E') of the liquid crystal compound of Example 3 against temperature.

The liquid crystal cell thus prepared was cooled down to a temperature where a phase SmC* A at low temperature side appeared. Then, the relative dielectric constant of the liquid crystal cell was determined by using an impedance analyzer while raising the temperature of the liquid crystal cell at a temperature gradient of 0.1° C./min. FIG. 8 shows the variations of the relative dielectric constant of the liquid crystal composition with temperature. From FIG. 8, it can be understood that a phase SmC* A (1) became an antiferroelectric phase at high temperature side (SmC* A2) (3) via a phase SmC*γ (2) and that the relative dielectric constant slightly fell at phase (3).

Figure 9:
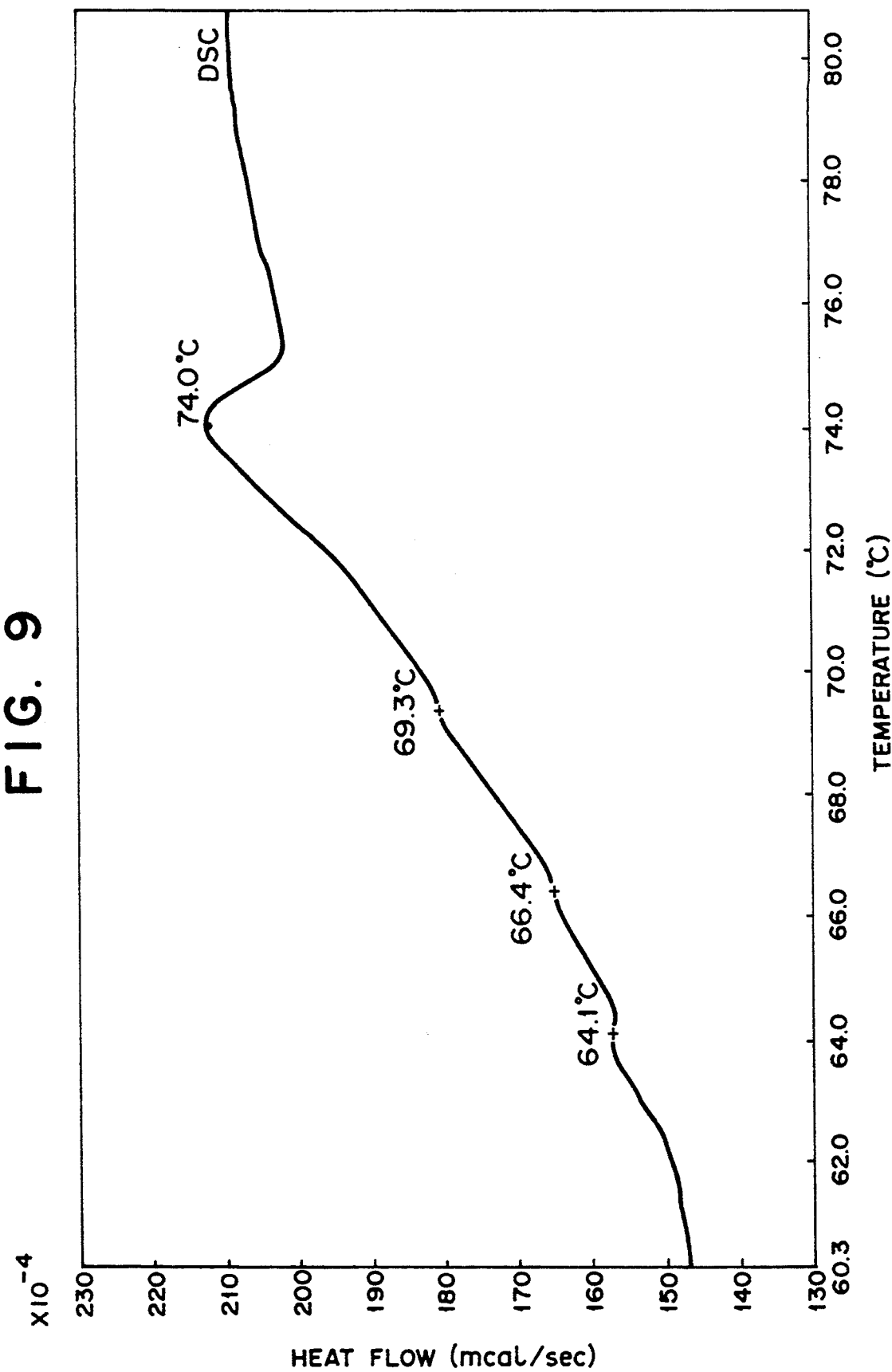
FIG. 9 is a graph showing the relationship between exothermic peaks and temperature in a differential thermal analysis of the liquid crystal compound of Example 3.

Heat flow (150.0° C. to 0.0° C., cooling rate 3° C./min) in differential scanning calorimeter (DSC) was also determined. FIG. 9 shows exothermic peaks observed at from 80° C. to 60° C. which indicate phase transition temperatures.

From the results of determination of relative dielectric constant and DSC, phase transition temperatures of the compound of Example 3 are summarized as follows:

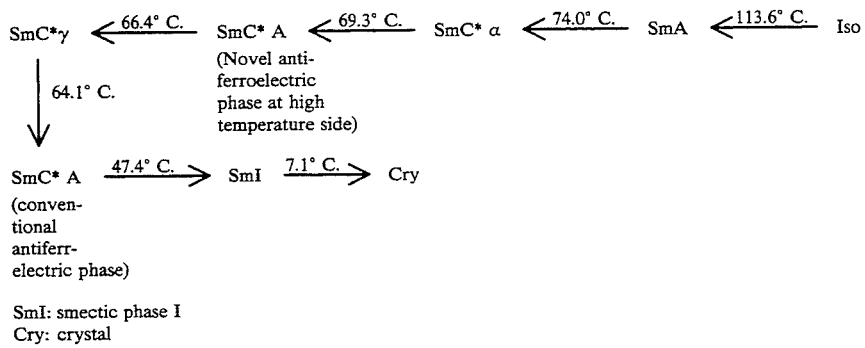

SmI: smectic phase I
Cry: crystal

The relative dielectric constant was determined by using an impedance analyzer type YHP4194A produced by Yokogawa Hulett Packard Corp.

From the phase series shown above, it can be understood that an antiferroelectric phase at high temperature side appeared at a temperature of from 69.3° C. to 66.4° C.

EXAMPLE 4

(1) R-(−)-4(1-methylheptyloxycarbonyl)phenyl 4'-octyloxybiphenyl-4-carboxylate (hereinafter referred to as R-(−)-MHPOBC) represented by the formula (VI) and having one antiferroelectric phase and R-(31)-4(1-methylheptyloxycarbonyl)phenyl 4'-octylcarbonyloxybiphenyl-4-carboxylate (hereinafter referred to as R-(−)-MHPOCBC) having one antiferroelectric phase were mixed at a weight ratio of 95:5 to prepare a liquid crystal composition.

The phase series of the liquid crystal composition thus prepared was as follows:

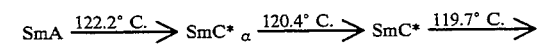

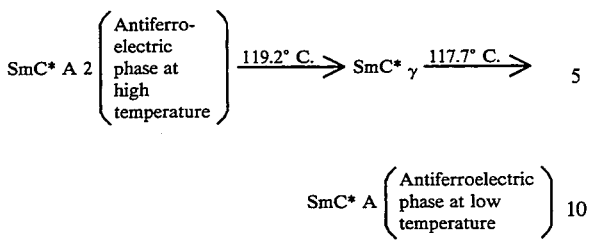

From the phase series shown above, it can be understood that an antiferroelectric phase appeared at high temperature side at a temperature of from 119.7° C. to 119.2° C. in this Example 4 (1).

(2) R-(—)-MHPOBC in an amount of 90 parts by weight was mixed with 10 parts by weight of R-(—)-MHPOCBC to prepare a liquid crystal composition.

The phase series of the liquid crystal composition was as follows:

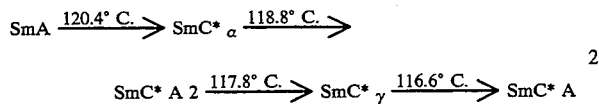

From the phase series shown above, it can be understood that an antiferroelectric phase at high temperature side appeared at a temperature of from 118.8° C. to 117.8° C. in this Example 4 (2).

(3) R-(—)-MHPOBC in an amount of 80 parts by weight was mixed with 20 parts by weight of R-(—)-MHPOCBC to prepare a liquid crystal composition.

The phase series of the liquid crystal composition was as follows:

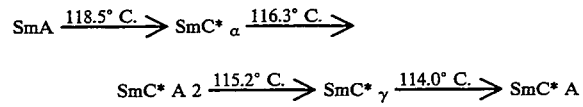

From the phase series shown above, it can be understood that an antiferroelectric phase at high temperature side appeared at a temperature of from 116.3° C. to 115.2° C. in this Example 4 (3).

EXAMPLE 5

(1) R-(—)-4(1-methylheptyloxycarbonyl)phenyl 4'-octyloxycarboxybiphenyl-4-carboxylate (hereinafter referred to as R-(—)-MHPOOCBC) represented by the formula (VIII) and exhibiting no antiferroelectric phase (but exhibiting a ferroelectric phase and ferrielectric phase) in an amount of 80 parts by weight was mixed with 20 parts by weight of R-(—)-MHPOCBC exhibiting an antiferroelectric phase to prepare a liquid crystal composition.

The phase series of the liquid crystal composition was as follows:

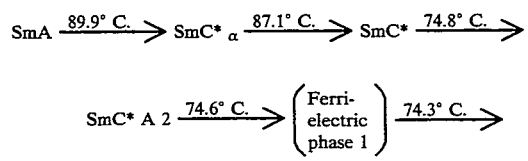

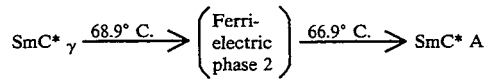

From the phase series shown above, it can be understood that a new antiferroelectric phase (SmC* A2) appeared at a temperature of from 74.8° C. to 74.6° C. in this Example 5 (1). (2) R-(—)-MHPOOCBC in an amount of 70 parts by weight was mixed with 30 parts by weight of R-(—)-MHPOCBC to prepare a liquid crystal composition. The phase series of the liquid crystal composition was as follows:

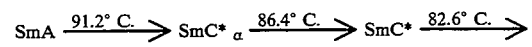

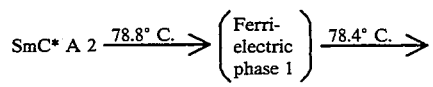

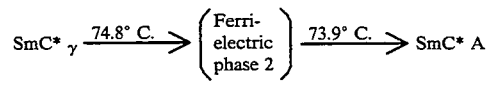

From the phase series shown above, it can be understood that an antiferroelectric phase at high temperature side appeared at a temperature of from 82.6° C. to 78.8° C. in this Example 5 (2). (3) R-(—)-MHPOOCBC in an amount of 60 parts by weight was mixed with 40 parts by weight of R-(—)-MHPOCBC to prepare a liquid crystal composition. The phase series of the liquid crystal composition was as follows:

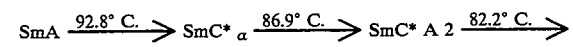

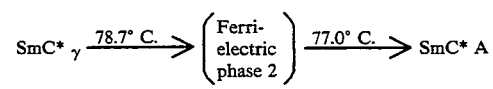

From the phase series shown above, it can be understood that an antiferroelectric phase at high temperature side appeared at a temperature of from 86.9° C. to 82.2° C. in this Example 5 (3).

(4) R-(—)-MHPOOCBC in an amount of 50 parts by weight was mixed with 50 parts by weight of R-(—)-MHPOCBC to prepare a liquid crystal composition.

The phase series of the liquid crystal composition was as follows:

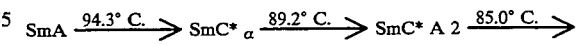

From the phase series shown above, it can be understood that an antiferroelectric phase at high temperature side appeared at a temperature of from 89.2° C. to 85.0° C. in this Example 5 (4).

(5) R-(—)MHPOOCBC in an amount of 40 parts by weight was mixed with 60 parts by weight of R-(—)-MHPOCBC to prepare a liquid crystal composition.

The phase series of the liquid crystal composition was as follows:

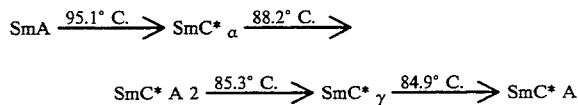

From the phase series shown above, it can be understood that an antiferroelectric phase at high temperature side appeared at a temperature of from 88.2° C. to 85.3° C. in this Example 5 (5).

EXAMPLE 6

R-(−)-4(1-methylpentyloxycarbonyl)phenyl 4'-decyloxycarboxybiphenyl-4-carboxylate represented by the formula (X) and exhibiting no antiferroelectric phase (but exhibiting a ferroelectric phase) in an amount of 60 parts by weight was mixed with 40 parts by weight of R-(−)MHPOCBC exhibiting an antiferroelectric phase to prepare a liquid crystal composition.

The phase series of the liquid crystal composition was as follows:

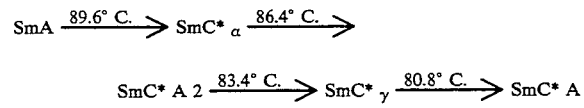

From the phase series shown above, it can be understood that a new antiferroelectric phase (SmC* A2) appeared at a temperature of from 86.4° C. to 83.4° C. in this Example 6.

EXAMPLE 7

FIG. 2 shows an enlarged cross-sectional perspective view illustrating a whole construction of a liquid crystal element of the present invention. The liquid crystal element was constructed by sealing an antiferroelectric liquid crystal 6 between a pair of electrode substrates 1 and 2 which were arranged in parallel each other with a space of 10 μm.

Electrode substrates 1 and 2 were constructed by placing transparent electrodes 1a or 2a comprising a transparent conductive film such as indium oxide and tin oxide on the inner surface of a transparent glass or resin 1c or 2c and further placing an oriented control film 1b or 2b on the inner surface of 1a or 2a facing towards a liquid crystal 6, respectively.

As the antiferroelectric liquid crystal 6, an antiferroelectric phase of the liquid crystal compound of Example 1 of the present invention was used at the high temperature side.

Figure 10:
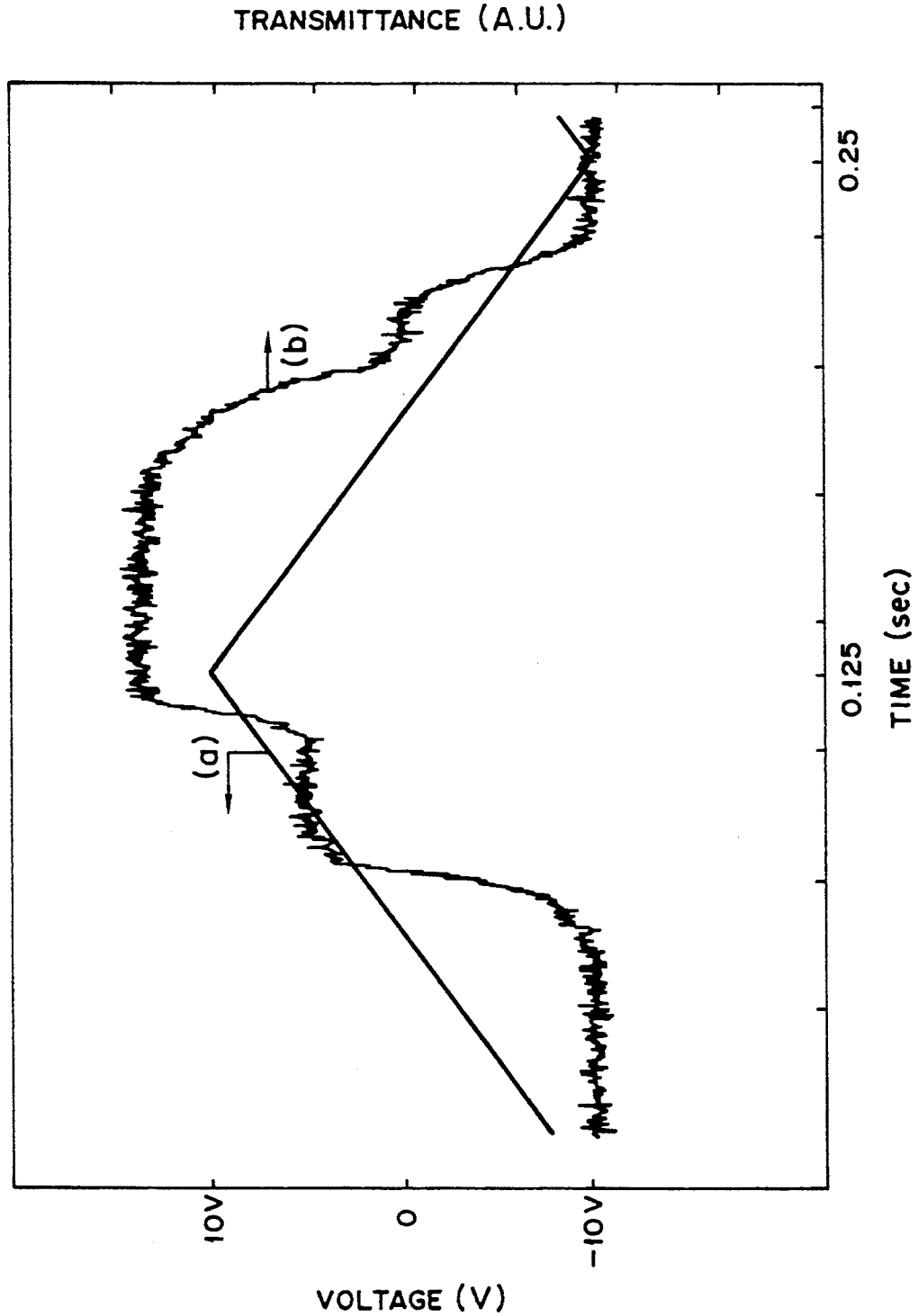
FIG. 10 is a graph showing the variations of the triangular wave voltage (a) applied at 71.5° C. on the liquid crystal compound of Example 1 and the light transmittance of the compound with time in Example 7, respectively.

Polarizing plates 4 and 5 were orthogonally arranged with each other. The liquid crystal element thus prepared was applied with such a triangular wave voltage of ±10 V at 2.5 Hz as shown in FIG. 10 at 71.5° C. to obtain all optical response accompanied with switchings as shown in FIG. 10(b).

We claim:

1. The liquid crystal composition having antiferroelectric phases at two temperature ranges comprising not less than 80 parts by weight of a compound represented by the general formula (III):

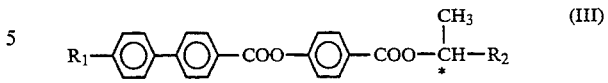

wherein $R_1$ is an alkyl group having from 4 to 18 carbon atoms, $R_2$ is an alkyl group having from 4 to 18 carbon atoms, and * shows an asymmetric carbon atom, and less than 20 parts by weight of a compound represented by the general formula (IV):

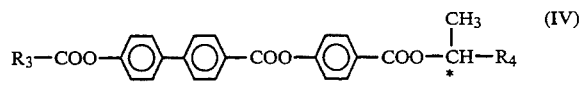

wherein $R_3$ and $R_4$ are independently selected from the group consisting of alkyl groups having from 4 to 18 carbon atoms, and * shows an asymmetric carbon atom, the compounds of formula (III) and formula (IV) having an optical purity of higher than 80% e.e., respectively; when the compound of the general formula (III) is an R-isomer, the compound of the general formula (IV) is also an R-isomer; and when the compound of the general formula (III) is an S-isomer, the compound of the general formula (IV) is also an S-isomer.

2. The liquid crystal compound according to claim 1 wherein the compound is represented by the general formula (I)

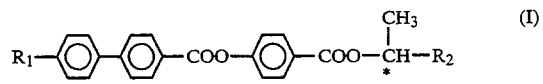

wherein $R_1$ and $R_2$ are independently selected from the group consisting of alkyl groups having from 4 to 18 carbon atoms, and * shows an asymmetric carbon atom and wherein the compound represented by the general formula (I) has an optical purity of higher than 80% e.e.

3. The liquid crystal compound according to claim 2 wherein the compound represented by the general formula (I) is 4(1-methylheptyloxycarbonyl)phenyl 4'-octylbiphenyl-4-carboxylate represented by the formula (II):

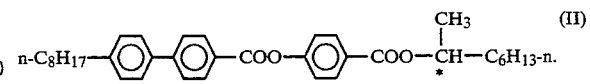

4. The liquid crystal composition according to claim 1 wherein the liquid crystal composition is a mixture of not less than 80 parts by weight of R-(−)-4(1-methylheptyloxycarbonyl)phenyl 4'-octylbiphenyl-4-carboxylate and less than 20 parts by weight of R-(−)-4-(1-methylheptyloxycarbonyl)phenyl 4'-octylcarbonyloxybiphenyl-4-carboxylate represented by the formula (V):

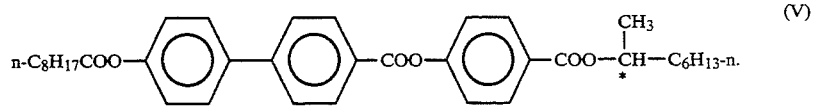

5. The liquid crystal composition comprises 80 to 40 parts by weight of a compound represented by the general formula (VII):

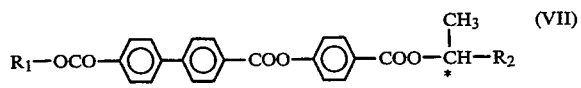

wherein $R_1$ and $R_2$ are independently selected from the group consisting of alkyl groups having from 4 to 18 carbon atoms, and * shows an asymmetric carbon atom, and 20 to 60 parts by weight of a compound represented by the general formula (IV):

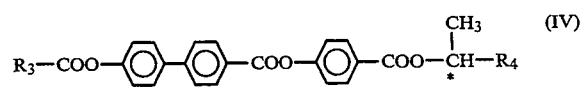

wherein $R_3$ and $R_4$ are independently selected from the group consisting of alkyl groups having from 4 to 18 carbon atoms, and * shows an asymmetric carbon atom, the compounds having an optical purity of higher than 80% e.e., respectively; when the compound of the general formula (VII) is an R-isomer, the compound of the general formula (IV) also being an R-isomer; and when the compound of the general formula (VII) is an S-isomer, the compound of the general formula (IV) also being an S-isomer.

6. The liquid crystal composition according to claim 5 wherein the liquid crystal composition is a mixture of 80 to 40 parts by weight of 4-(1-methylheptyloxycarbonyl)phenyl 4'-octyloxycaroxybiphenyl-4-carboxylate represented by the formula (VIII):

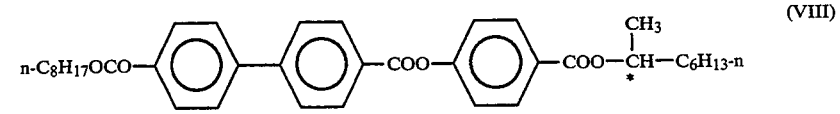

and 20 to 60 parts by weight of 4-(1-methyheptyloxycarbonyl)phenyl 4'-octylcarbonyloxybiphenyl-4-carboxylate represented by the formula (IX):

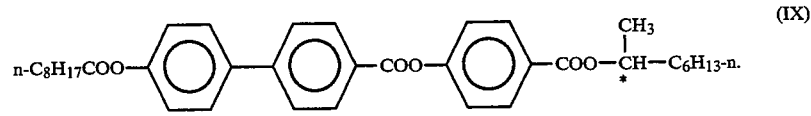

7. A liquid crystal element in which a liquid crystal composition is inserted between a pair of electrode substrates characterized in that the liquid crystal composition has an antiferroelectric phase in two temperature ranges.

8. The liquid crystal element according to claim 7 wherein the liquid crystal composition contains a compound represented by the general formula (I):

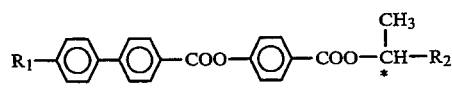

wherein $R_1$ and $R_2$ are independently selected from the group consisting of alkyl groups having from 4 to 18 carbon atoms, and * shows an asymmetric carbon atom, and wherein the compound of the general formula (I) has an optical purity of higher than 80% e.e.

9. The liquid crystal element according to claim 8 wherein the compound of the general formula (I) is 4(1-methylheptyloxycarbonyl)phenyl 4'-octylbiphenyl-4-carboxylate represented by the formula (II):

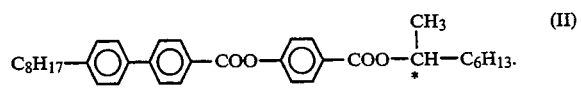

10. The liquid crystal element according to claim 7 wherein the liquid crystal composition comprises not less than 80 parts by weight of a compound represented by the general formula (III):

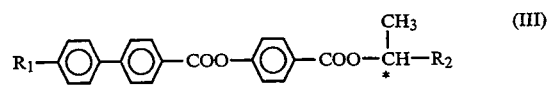

wherein $R_1$ is an alkyl group or alkoxy group having from 4 to 18 carbon atoms, $R_2$ is an alkyl group having from 4 to 18 carbon atoms, and * shows an asymmetric carbon atom, and less than 20 parts by weight of a compound represented by the general formula (IV):

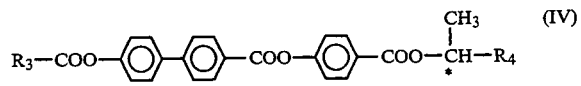

wherein $R_3$ and $R_4$ are independently selected from the group consisting of alkyl groups having from 4 to 18 carbon atoms, and * shows an asymmetric carbon atom, the compounds of formula (I) and formula (II) having an optical purity of higher than 80% e.e., respectively, when the compound of the general formula (III) is an R-isomer, the compound of the general formula (IV) is also being an R-isomer; and when the compound of the general formula (III) is an S-isomer, the compound of the general formula (IV) is also an S-isomer.

11. The liquid crystal element according to claim 7 wherein the liquid crystal composition is a mixture of not less than 80 parts by weight of R-(−)-4(1-methylheptyloxycarbonyl)phenyl 4'-octylbiphenyl-4-carboxylate having an optical purity of greater than 80% e.e. and less than 20 parts by weight of R-(−)-4-(1-methylheptyloxy-carbonyl)phenyl 4'-octylcarbonyloxybiphenyl-4-carboxylate represented by the formula (V):

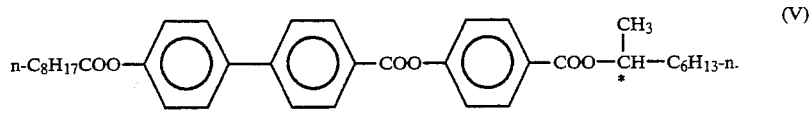 (V)

12. A liquid crystal device having the crystal element according to any one of claims 7,8,9,10 or 11 in which a temperature compensatory circuit is provided to stably maintain the temperature range in which an antiferroelectric phase of a liquid crystal composition at high temperature side appears.

13. A liquid crystal device having a liquid crystal element according any one of claims 7, 8, 9, 10 or 11, said liquid crystal device having a temperature compensatory circuit to maintain the temperature range in which an antiferroelectric phase of a liquid crystal composition at a high temperature side appears, and wherein said liquid crystal device is driven at a temperature in the temperature range in which an antiferroelectric phase of a liquid crystal composition at a high temperature side appears.

* * * * *